Dec. 8, 1970     JEAN-CLAUDE COUSIN     3,546,044
MACHINE FOR MAKING UNWOVEN SHEET MATERIAL
Filed Dec. 8, 1967                5 Sheets-Sheet 1

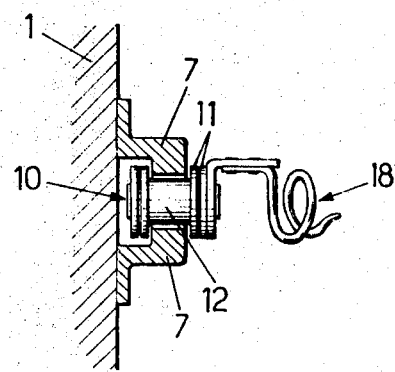
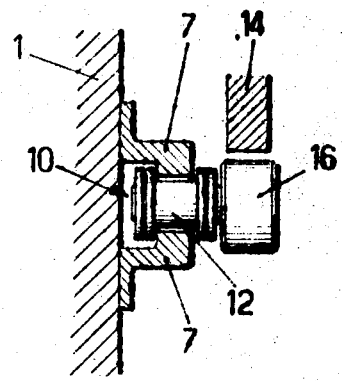
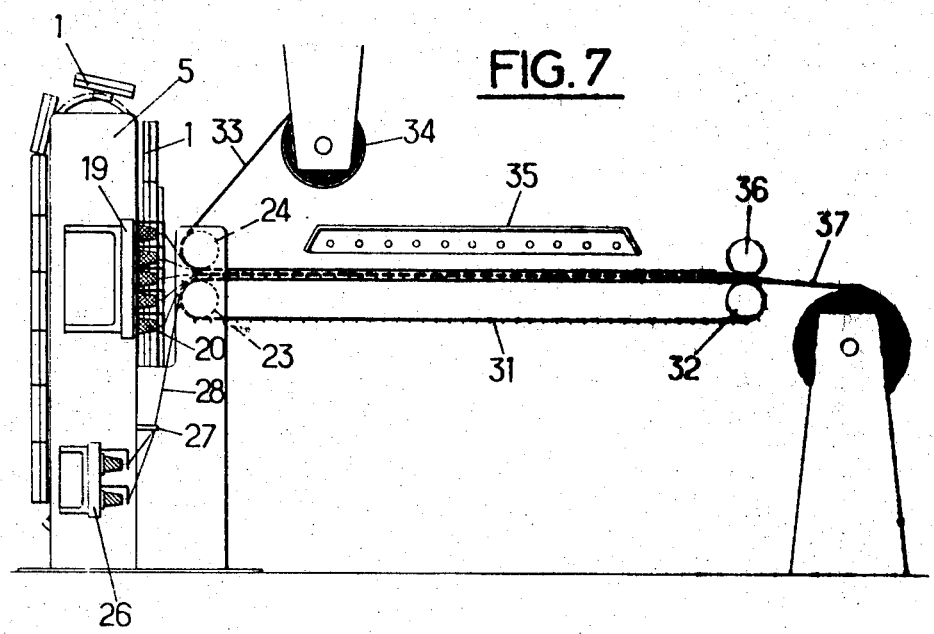

United States Patent Office 3,546,044
Patented Dec. 8, 1970

3,546,044
MACHINE FOR MAKING UNWOVEN
SHEET MATERIAL
Jean-Claude Cousin, La Sapiniere,
Wervicq-Sud, Nord, France
Filed Dec. 8, 1967, Ser. No. 689,020
Claims priority, application France, Dec. 12, 1966,
87,116
Int. Cl. B65h 54/24, 54/30, 59/10
U.S. Cl. 156—441                                   7 Claims

ABSTRACT OF THE DISCLOSURE

A machine for manufacturing unwoven sheet material which comprises an effective endless serpentine track mounted to be advanced along an annular path, said track being symmetrical with half thereof lying on each side of the center of said path. A chain of thread guides is movably mounted on said track, but restrained from advancing with it along the annular path, so that advancement of the track causes the thread guides to move back and forth transversely of the track. The chain is so long that some thread guides are always moving in a direction opposite to that in which the remainder move, thus causing the threads to cross each other, even though they are not interwoven.

The invention relates to the manufacture of unwoven sheet material, that is to say sheet material in which the warp and woof threads are not interwoven, but simply laid across each other at right angles and caused to adhere to each other by any suitable means. In manufacturing such sheet material, a thread guide positioned at the end of a long arm is generally used, and is moved back and forth as a substitute for the movement of a shuttle. Sheet material may be produced in this manner much more rapidly than cloth produced by weaving, but this speed is nonetheless relatively slow, since each movement of the arm lays down only a single transverse thread. On the other hand, the movements are neither absolutely straight, or uniform, so that the threads constituting the sheet material are themselves neither absolutely straight nor perpendicular to each other. This leads to local deformations in the resulting product. Other machines using a larger number of moving threads positioned about the peripheries of large rotating wheels make it possible to increase the speed of production, but accentuate the defects in the product. Moreover, these machines are extremely cumbersome.

The object of the present invention, is, on the contrary, to provide a machine for making nonwoven sheet material which has a high output, takes up little space, and in which all the threads are straight and at right angles to each other, except at the edges of the sheet.

It is a further object of the invention to provide a machine for making unwoven sheet material essentially characterized by the fact that it comprises two cylinders positioned tangent to each other for winding up the sheet material being formed and a thread distributing device positioned on the side at which a large number of threads arrive in a direction substantially perpendicular to that in which the sheet travels, all these thread being directed by guide means mounted one after the other on a chain which moves on rails along a segmented path, while the rails themselves move transversely with respect to the general direction of the segmented path and in the opposite direction so that the average position of the chain remains unchanged.

In a preferred embodiment of the invention, the rails defining the segmented path are fastened to an endless chain and the chain carrying the thread guides is driven by two rollers carried by that chain, spaced a certain distance apart, and travelling on stationary rails. The machine also comprises means for feeding in the warp threads so as to produce a sheet having triangular meshes.

Figure 1:
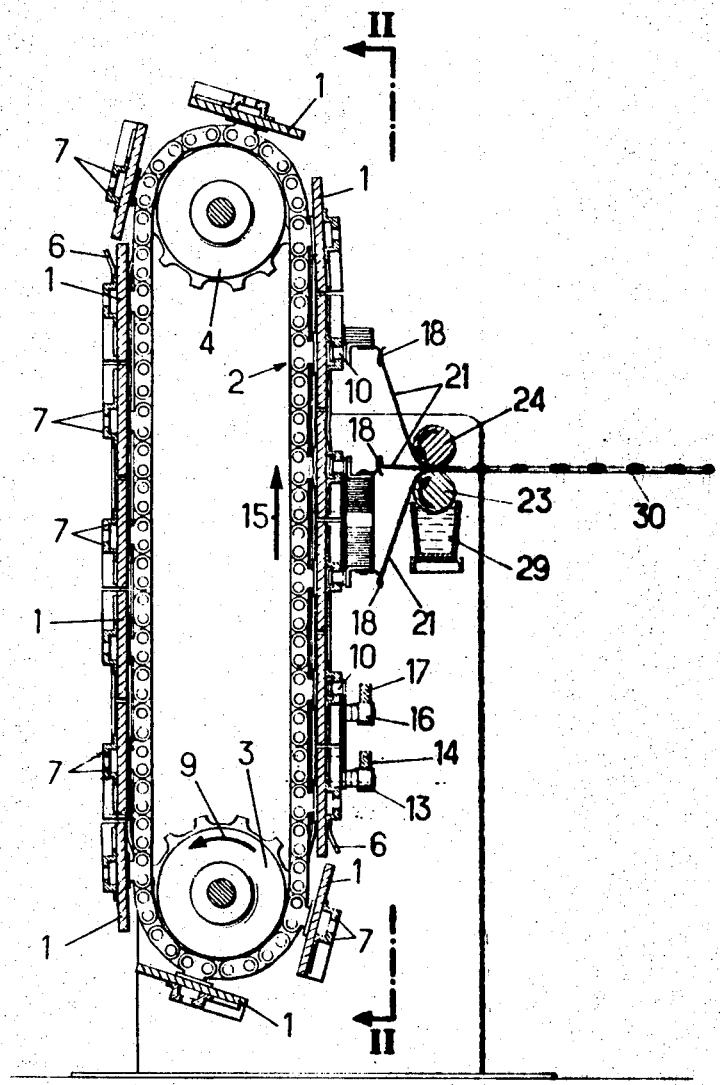
Figure 2:
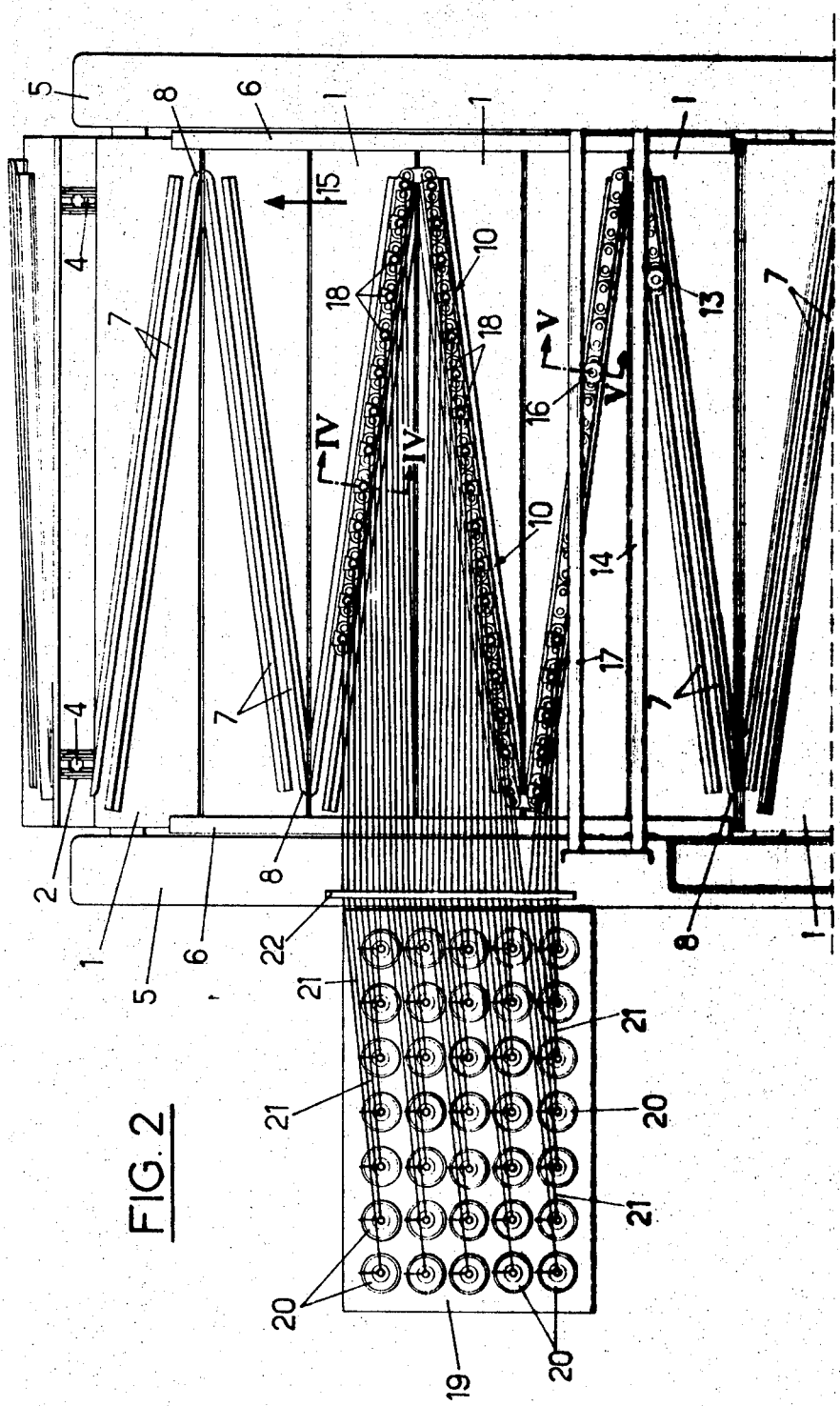
Figure 3:
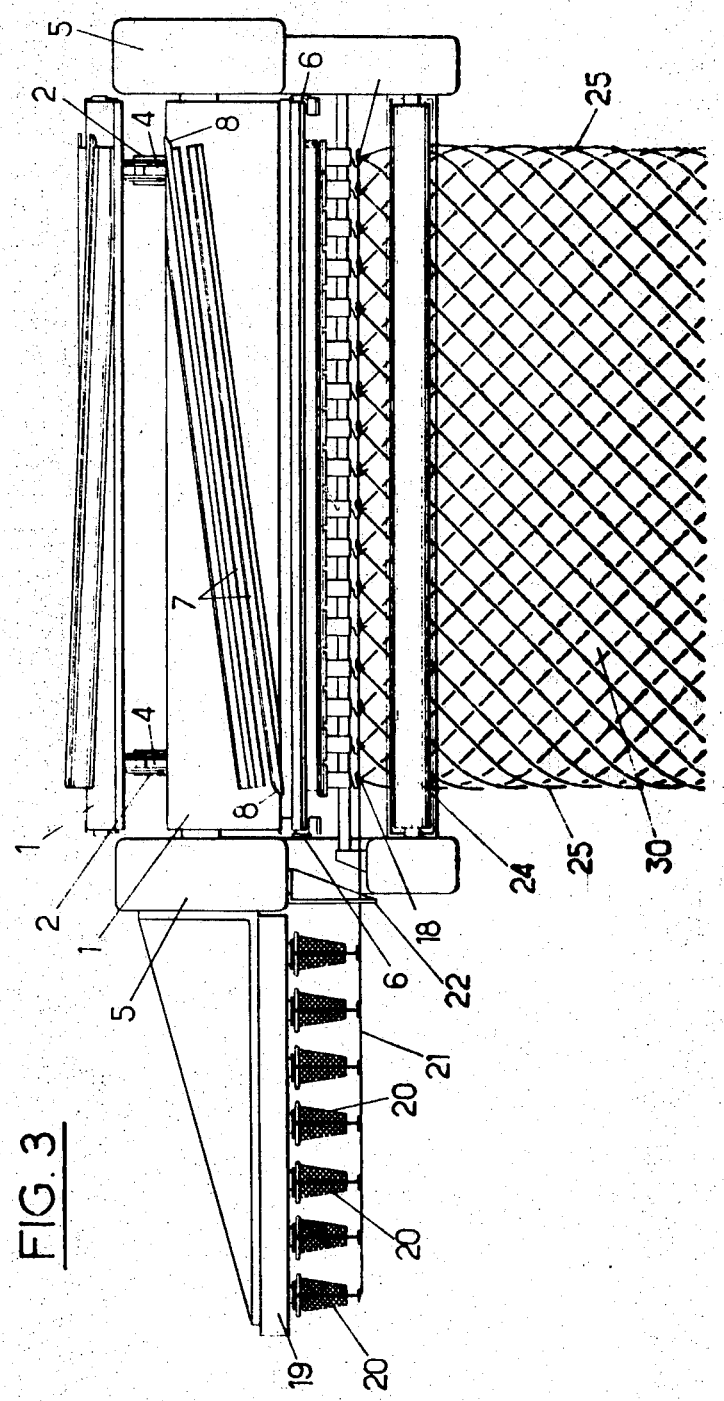
Figure 6:
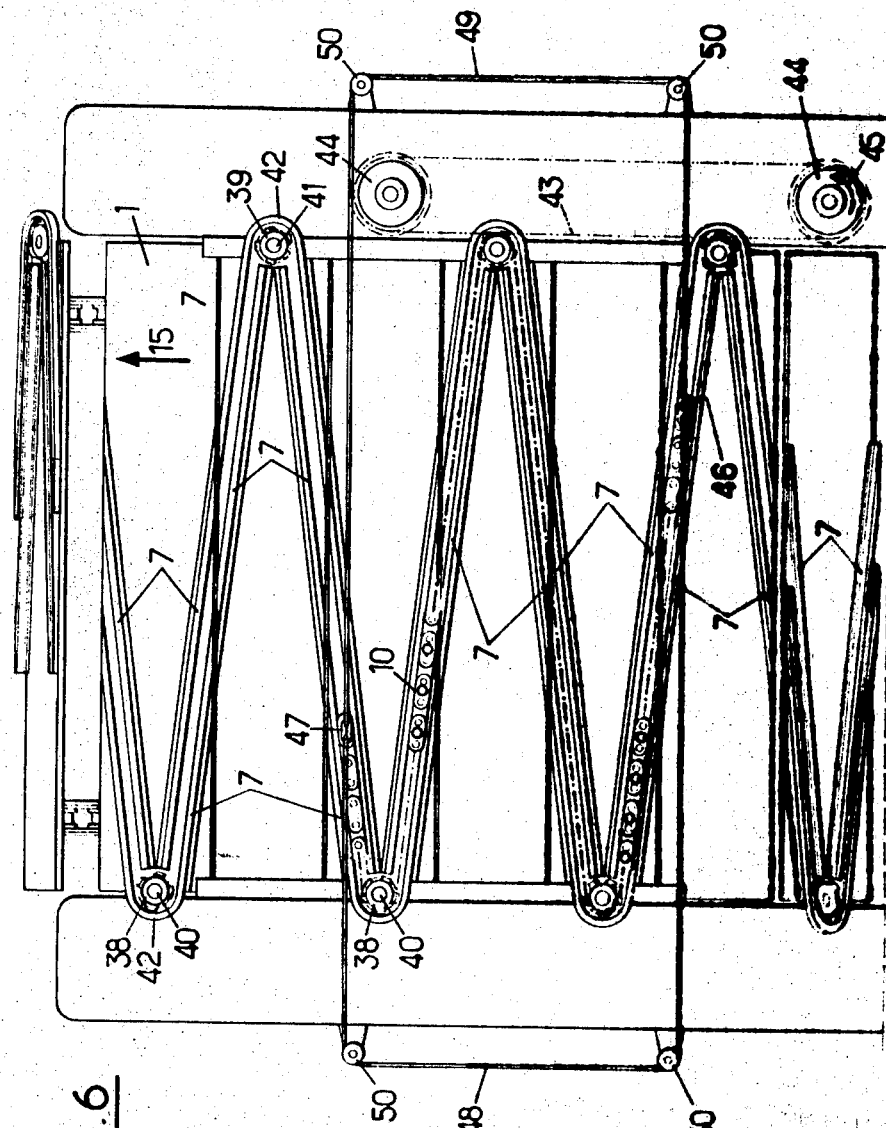

In order that the invention may be better understood, several embodiments thereof will now be described, purely by way of illustration and example, with reference to the accompanying drawings, in which:

FIG. 1 is a vertical section taken through the machine;
FIG. 2 is a section taken along the line II—II of FIG. 1;
FIG. 3 is a top plan view of the machine;
FIG. 4 is a sectional view taken along the line IV—IV of FIG. 1, but on a larger scale;
FIG. 5 is a sectional view taken along the line V—V of FIG. 2, but on a larger scale;
FIG. 6 shows an alternative type of driving means; and
FIG. 7 shows a machine designed to produce a sheet of plastic material reinforced with nonwoven sheet material.

The machine according to the invention comprises a certain number of flat slats 1 fastened at each end to two endless chains 2, driven by two lower sprocket wheels 3 through variable speed-reducing gearing (not shown), and guided at the top by two sprocket wheels 4. This mechanism may be vertically positioned in a frame 5, and the slats 1 abut each other edge to edge at the front of the machine, while sliding in U-shaped vertical guides 6.

Rails 7, having the section shown in FIG. 4, are fastened to slats 1. These rails are straight and connected to each other at the junction between adjacent slats 1 by means of a curved part 8, having a short radius of curvature. The group of rails thus defines a segmented path which extends continuously from the bottom to the top when the sprocket wheel 3 is driven in the direction indicated by the arrow 9.

Inside these rails, and in the middle of the front of the machine, as shown on FIG. 2, is a chain 10 of the roller chain type, formed from links 11 and rollers 12, which roll in the slot in rails 7. At the turns in the segmental path, the rollers roll on a part 8, and opposed rail sections are unnecessary, as is obvious from FIG. 2.

At the lower end of the chain 10 is a roller 13 mounted to rotate freely on a pin fixed to the last link. This roller can roll under a horizontal rail 14 fixed to the frame 5 and shown on FIGS. 2 and 5.

In this way, when the group of slats 1 at the front of the machine moves vertically upward, as indicated by the arrow 15, the roller 13 is constrained by the rail 14 to travel along the rail 7, in which it is slidable, as a result of the latter's angular position. It thus drives the chain 10 at a constant speed. It follows that all the other links of the chain remain at a substantially constant height as a consequence of the two movements, i.e., that of the group of slats and that of the chain 10 relative to the slats.

Actually, because of the radii of the rounded parts 8 which are required to permit the rollers 12 to pass from one segment of the segmented path to the next, the relative movement of the chain 10 is slightly slowed each time the roller 11 passes over the rounded members 8. To avoid this slowing down, which might adversely affect the functioning of the machine, a second roller 16, identical to the roller 13, is mounted on the chain 10 behind the roller 13 at a distance equal to half the length of the rails 7. This roller 16 rolls beneath a rail 17, horizontally mounted on the frame 5. Thus, in any position such as that shown on FIG. 2, the two rollers 13 and 16, both drive the chain, and when one of the rollers passes over a curved connecting member 8, the other roller continues to drive the chain.

Alternatively, the mechanism shown in FIG. 6 may be used to drive the chain 10 at constant speed. In this case the rails 7 pass over the line of separation between two successive slats and are each divided into two parts meeting each other at that line. The corners between successive straight segments are provided with sprocket pinions 38 and 39 freely rotatable on pins 40 and 41 fixed to slats 1. Each of these sprocket pinions is partially encircled by a curved member 42 completing the rail 7 on the outside of the curve. Thus the chain 10 travels alternately over several of these sprocket pinions, three for example, as shown in FIG. 6, and is driven by using as sprocket pinions two-part pinions 39, one part of which engages the chain 10 while the other engages an endless chain 43 extending laterally between two sprockets 44, one of these sprockets being driven in the direction indicated by the arrow 45, always assuming that the slats travel in the direction indicated by the arrow 15. The drive for this chain 43 is synchronized with the drive for the chains 2 which carry the slats 1, in a ratio such that the chain 10 is never driven by the slats.

For example, if the slope of the rails 7 is 10%, the speed of the chain 10 must be ten times greater than that of the chains and, if the two parts of the pinion 39 have the same diameter, the chain 43 must have a linear speed nine times greater than that of the chains 2. Alternatively, the endless chain 43 may be replaced by a stationary rack, if the two parts of the pinions 39 are separate and interconnected by a suitable speed multiplying transmission. In this embodiment the chain 10 is tensioned by attaching the first link 46 and the last link 47 to a pair of cables 48 and 49 which travel on four stationary pulleys 50 and 80 selecting the length of the chain 10 so that its ends 46 and 47 move constantly in the opposite direction and one of the two passes over a pinion 39 while the other passes over a pinion 40.

In these two embodiments the chain 10 also carries a certain number of pig-tail thread guides 18 which are regularly distributed over a certain length beginning at the other end of the chain 10. The machine also comprises a bobbin support 19 at the right of the frame 5 which carries a number of bobbins 20 equal to the number of thread guides 18 on the chain 10. Each of these threads 21 travels from a bobbin 20 through a set of guide pins 22 to a thread guide 18. It then travels toward a pair of cylinders 23 and 24 positioned just in front of the thread guides 18 which squeeze the threads between them while guiding them as a layer in the direction indicated by the arrows.

Under these conditions, when the drive means consisting of the wheels 9 and the drive means consisting of the cylinders 23 and 24 are driven at suitably proportioned speeds, each of the thread-guides 18 moves horizontally at a uniform speed, reversing its direction of movement each time it passes over a curved member 8. All the guide means 18 move in the same way, but with a slight difference in time which corresponds to a distance between any given thread guide and the one which succeeds it along the chain. In particular, it will be readily seen that at any given instant half the thread guides are moving from left to right while the remainder move from right to left.

It follows that the threads are positioned as shown in FIG. 3 in two crossed layers, with one layer folded over the other at the edges 25. The angle at which the two layers cross each other depends only on the ratio between the speeds at which the wheels 9 and cylinders 23 and 24 are driven. This angle may be 90° as shown in FIG. 3 if the tangential speed of the cylinders 23 and 24 is equal to the linear speed at which the chain 10 travels. This speed is a function of the speed at which the chain is driven and the angle of inclination of the rails 7. It will be seen that the resulting sheet has no true warp and woof threads but only bias threads, all of which have the same function.

It is also possible as shown in FIG. 7, to provide an additional bobbin support 26 from which the threads pass through a supplementary set of fixed thread guides 27 to form a set of parallel threads 28 which cross the others in such a manner as to form a series of triangles. In particular, it is suggested that in this case, the relative speeds of the wheels 9 and the cylinders 23 and 24 be so regulated that the threads 21 cross threads 28 at 60° angles so as to form equilateral triangles.

At the same time that the cylinders 23 and 24 drive the threads, which are simply crossed and superposed, the cylinder 23 receives a supply of an adhesive product from a trough 29 so as to cause the various threads to adhere to each other when crossed. The adhesive is dried immediately after leaving the cylinders.

The unwoven cloth 30 which is thus produced very rapidly with either square or triangular mesh, may be used for many purposes, either alone as cheap wrapping material, or as a reinforcement for various products, particularly products comprising cellulose padding. It may also be used as a reinforcement for plastic sheet material. In this case it is particularly advantageous to manufacture the unwoven cloth at the time it is incorporated into the plastic sheet material by using the arrangement shown on FIG. 7, the unwoven sheet being in this case preferably made with triangular meshes.

In this embodiment the supply of adhesive is eliminated and the roller 23 carries only an endless belt 31 which travels over a roller 32. This belt is made from a sheet of a type already known in the textile industry which comprise a great many microscopic perpendicular pins. These pins slide between the threads at the input side of the cylinders 23 and 24 and keep these threads in their relative position. A sheet of plastic material 33 supplied by a roller 34 is led directly to the input side of the roller 24 so as to lie on top of the unwoven sheet.

The plastic sheet, the layer of threads, and the belt then pass under a bank of infrared heaters 35 which heat the plastic sheet 33 until it is softened. Another roller 36 immediately presses the plastic sheet against the layer of threads so that it adheres thereto, and thus produces at the output of the machine a continuous strip of plastic material strongly reinforced at an extremely low cost, due to the high speed at which the machine operates.

It will of course be appreciated that the foregoing methods and embodiments have been given purely by way of example and may be modified as to detail without thereby departing from the basic principles of the invention as set forth in the following claims.

In particular, the chain carrying the thread guides may be replaced by a flexible device. The slat-carrying chains may also be replaced by a cylinder having a large radius in which case the chain carrying the thread guides may take the form of an endless chain retained in a zig-zag position by sprockets encircling the cylinder. The chain is then driven through those sprockets without any need for guide rails or driving rails.

What is claimed is:

1. A machine for manufacturing unwoven sheet material which comprises in combination an effectively endless serpentine track, a chain of thread guide carriers movably carried by said track, means for advancing said track along an annular path, said track being symmetrical with half thereof lying on each side of the center of said annular path, and means for restraining said chain against movement in said annular path while permitting movement of said chain relative to said track, so that movement of said track results in reciprocation of said thread guide carriers transversely with respect to said annular path, a bobbin carrier positioned to supply threads to said thread guides in a plane substantially parallel to that of said chain, and a pair of parallel rollers positioned transversely of said annular path to receive said threads after they have left said thread guides.

2. A machine as claimed in claim 1 in which said track comprises a plurality of segments, each segment being mounted on one of a set of parallel slats, and said slats being advanced along said path by chain means fastened to their ends, and said restraining means comprises two stationary bars extending transversely with respect to said annular path, and pins carried by said chain which engage said stationary bars.

3. A machine as claimed in claim 1 in which said track comprises a plurality of segments, each segment being mounted on one of a set of parallel slats, and comprising sprocket means mounted on said slats which engage said chain, and said constraining means being drive means engaging said sprockets to drive said chain in a direction opposite to that in which it is being carried by said track.

4. A machine as claimed in claim 1 comprising an additional bobbin carrier and a set of fixed thread guides positioned to lead threads from said second bobbin carrier across the other threads to form a product having triangular meshes.

5. A machine as claimed in claim 1 comprising means for supplying an adhesive to one of said rolls.

6. A machine a claimed in claim 1 comprising means for applying a sheet of heated thermoplastic material to said unwoven sheet material and compressing the two together.

7. A machine as claimed in claim 1 in which the length of said chain is at least twice as great as the width of said path.

References Cited
UNITED STATES PATENTS

| | | | |
|---|---|---|---|
| 3,000,432 | 9/1961 | Olken | 156—441X |
| 3,345,231 | 10/1967 | Gidge et al. | 156—441 |
| 3,414,453 | 12/1968 | Carter | 155—441X |

BENJAMIN A. BORCHELT, Primary Examiner

T. H. WEBB, Assistant Examiner

U.S. Cl. X.R.

156—440, 459, 543